United States Patent
Meyer et al.

(10) Patent No.: US 9,144,961 B2
(45) Date of Patent: Sep. 29, 2015

(54) ORIENTATION OF INTERFACING PROJECTIONS

(71) Applicants: Jonathan Meyer, Calne (GB); Daniel Johns, Cullompton Devon (GB)

(72) Inventors: Jonathan Meyer, Calne (GB); Daniel Johns, Cullompton Devon (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 14/179,293

(22) Filed: Feb. 12, 2014

(65) Prior Publication Data
US 2014/0158294 A1 Jun. 12, 2014

Related U.S. Application Data

(62) Division of application No. 13/260,294, filed as application No. PCT/GB2010/050476 on Mar. 22, 2010, now Pat. No. 8,690,472.

(30) Foreign Application Priority Data

Mar. 25, 2009 (GB) .................................. 0905133.5

(51) Int. Cl.
 *B23P 25/00* (2006.01)
 *B23Q 3/00* (2006.01)
 (Continued)

(52) U.S. Cl.
 CPC ........... *B32B 37/144* (2013.01); *B23K 15/0086* (2013.01); *B23K 26/3206* (2013.01);
 (Continued)

(58) Field of Classification Search
 CPC ................ B21D 39/044; F16B 17/008; F16B 2015/0061; F16B 15/0046; F16B 4/004; B23P 11/00; F16D 1/072

USPC ........ 29/521, 523, 527.1, 524, 420, 423, 458, 29/469; 403/179, 205, 282, 283, 403, 291, 403/266, 270; 428/411.1, 457, 688, 119, 428/161; 156/91, 92, 250
 See application file for complete search history.

(56) References Cited

U.S. PATENT DOCUMENTS 2,400,266 A * 5/1946 Soffer ........................... 403/283
3,011,226 A * 12/1961 Menge .......................... 411/466
(Continued)

FOREIGN PATENT DOCUMENTS

DE  102006015145 A1  10/2007
DE  102006050365 A1  4/2008
(Continued)

OTHER PUBLICATIONS

International Search Report of PCT/GB2010/050476 dated Jun. 30, 2010.
(Continued)

*Primary Examiner* — David Bryant
*Assistant Examiner* — Bayan Salone
(74) *Attorney, Agent, or Firm* — Lowe Hauptman & Ham, LLP

(57) ABSTRACT

A method of joining a first component to a second component, the method comprising preparing the first component by forming an array of elongate projections on a bond surface of the component, each projection having a centerline, a tip, and a base. The centerline at the tip of each projection is oriented at an angle with respect to the normal to the bond surface at its base, and the angular orientation of the tip centerlines varies across the array of projections. Next, the first component and a flexible layer are brought together so as to embed the projections in the flexible layer before hardening the flexible layer to form the second component. Also, a joint so formed.

10 Claims, 5 Drawing Sheets

(51) Int. Cl.
*B21D 39/00* (2006.01)
*F16L 41/00* (2006.01)
*F16D 1/00* (2006.01)
*C04B 37/02* (2006.01)
*B32B 37/14* (2006.01)
*B23K 15/00* (2006.01)
*B23K 26/34* (2014.01)
*C09J 5/02* (2006.01)
*B23K 26/32* (2014.01)
*B23K 35/02* (2006.01)

(52) U.S. Cl.
CPC .............. *B23K26/328* (2013.01); *B23K 26/34* (2013.01); *B23K 26/345* (2013.01); *B23K 35/0244* (2013.01); *B23K 35/0255* (2013.01); *B23K 35/0272* (2013.01); *C09J 5/02* (2013.01); B23K 2201/18 (2013.01); B23K 2203/16 (2013.01); *Y10T 29/49826* (2015.01); *Y10T 403/42* (2015.01); *Y10T 403/4966* (2015.01); *Y10T 403/4974* (2015.01); *Y10T 403/54* (2015.01); *Y10T 403/73* (2015.01)

(56) References Cited

U.S. PATENT DOCUMENTS

| | | | | |
|---|---|---|---|---|
| 3,136,026 A * | 6/1964 | De Mestral | 28/161 |
| 3,214,816 A * | 11/1965 | Mathison | 24/450 |
| 3,320,649 A * | 5/1967 | Naimer | 28/161 |
| 4,198,734 A * | 4/1980 | Brumlik | 24/449 |
| 4,436,343 A * | 3/1984 | Schneider | 297/452.16 |
| 5,198,734 A * | 3/1993 | Johnson | 318/369 |
| 5,392,498 A * | 2/1995 | Goulait et al. | 24/452 |
| 5,792,411 A * | 8/1998 | Morris et al. | 264/400 |
| 5,887,320 A * | 3/1999 | Provost | 24/452 |
| 6,183,838 B1 * | 2/2001 | Kannankeril | 428/119 |
| 6,588,073 B1 * | 7/2003 | Zoromski et al. | 24/446 |
| 7,225,510 B2 * | 6/2007 | Gallant | 24/451 |
| 7,478,967 B2 * | 1/2009 | ter Braak | 403/2 |
| 7,667,158 B2 * | 2/2010 | Dance et al. | 219/121.66 |
| 7,725,992 B2 * | 6/2010 | Efremova et al. | 24/442 |
| 8,387,229 B2 * | 3/2013 | Meyer et al. | 29/521 |
| 8,690,472 B2 * | 4/2014 | Meyer et al. | 403/283 |
| 8,821,060 B2 * | 9/2014 | Meyer et al. | 403/266 |
| 2004/0126181 A1* | 7/2004 | ter Braak | 403/282 |
| 2006/0163222 A1* | 7/2006 | Dance et al. | 219/121.69 |
| 2010/0068464 A1* | 3/2010 | Meyer | 428/161 |
| 2010/0080951 A1* | 4/2010 | Del Campo Becares et al. | 428/99 |
| 2010/0247869 A1* | 9/2010 | Meyer et al. | 428/172 |
| 2010/0247934 A1* | 9/2010 | Meyer et al. | 428/457 |
| 2013/0183082 A1* | 7/2013 | Meyer et al. | 403/266 |
| 2014/0020826 A1* | 1/2014 | Meyer et al. | 156/303.1 |

FOREIGN PATENT DOCUMENTS

| | | |
|---|---|---|
| EP | 1028643 A1 | 8/2000 |
| EP | 1551590 A1 | 7/2005 |
| EP | 1605791 A2 | 12/2005 |
| GB | 1061076 A | 3/1967 |
| GB | 2382103 A | 5/2003 |
| RU | 2123916 C1 | 12/1998 |
| RU | 2243872 C1 | 1/2005 |
| WO | 9922626 A1 | 5/1999 |
| WO | 2004028731 A1 | 4/2004 |
| WO | 2004077979 A2 | 9/2004 |
| WO | 2008110835 A1 | 9/2008 |
| WO | WO 2008110835 A1 * | 9/2008 ............ B23K 26/34 |

OTHER PUBLICATIONS

Search Report of GB0905133.5 dated May 20, 2009.
Chinese Office Action dated Sep. 10, 2013, for corresponding Chinese Application No. 201080013186.4.

* cited by examiner

ORIENTATION OF INTERFACING PROJECTIONS

RELATED APPLICATIONS

The present application is a Divisional of U.S. application Ser. No. 13/260,294, filed on Sep. 24, 2011, which is a National Phase of International Application Number PCT/GB2010/050476, filed Mar. 22, 2010, and claims priority to, British Application Number 0905133.5, filed Mar. 25, 2009, the disclosures of which are hereby incorporated by reference herein in their entirety.

FIELD OF THE INVENTION

The present invention relates to a method of joining a component to another component; and a joint so formed.

BACKGROUND OF THE INVENTION

Joining between metallic or thermoplastic and composite components is currently approached in a number of ways, each with its own limitations.

The use of fasteners is commonplace but tends to result in de-lamination around fastener holes. Fastener holes are often difficult to drill in composites and significant reinforcement around fastener holes may be required, leading to increased weight. Fastened joints tend to be particularly weak in the pull-through direction (that is, the direction of axial load through the fastener). As such, fastened joints are not well suited to many aerospace applications.

Adhesive bonds are an increasingly common means of joining metallic components to composite laminates, however these perform poorly in peel, tension and cleavage, and tend to fail with little or no warning. Their weakness in peel and in tension makes bonded joints similarly limited in their application within conventional aerospace structures. Any mitigation for the poor performance in peel or tension tends to result in large bond surface areas, with the associated weight penalties that go with this.

WO 2004/028731 A1 describes a method by which surface features are generated by using a 'power-beam' such as an electron beam, in order to 'flick-up' surface material on a metallic component to sculpt protruding features that are intended to increase bond surface area and improve bond strength when incorporated into the matrix of a co-cured laminate.

WO 2008/110835 A1 describes a method by which surface features are "grown" on a bond surface of a component in a series of layers by an additive fabrication process.

The profile and shape of the surface features can be readily controlled so as to optimise the performance of the joint, particularly in tension and peel. Each surface feature may have a pointed tip such that the surface features may easily be embedded into series of laminate plies draped successively over the bond surface. The surface features may by asymmetrical so as to improve properties of the joint in a particular load direction.

However, the above methods suffer the problem that at least some of the surface features may tear through the laminate plies during formation of the joint, leading to a reduction in the strength of the completed joint. This problem is especially acute where the component is a corner bracket, or the like, such that the laminate plies need to be draped over a corner.

SUMMARY OF THE INVENTION

A first aspect of the invention provides a method of joining a first component to a second component, the method comprising preparing the first component by forming an array of elongate projections on a bond surface of the component, each projection having a centreline, a tip, and a base, wherein the centreline at the tip of each projection is oriented at an angle with respect to the normal to the bond surface at its base, and wherein the angular orientation of the tip centrelines varies across the array of projections; bringing the first component and a flexible layer together so as to embed the projections in the flexible layer; and hardening the flexible layer to form the second component after the array of projections has been embedded into it.

A second aspect of the invention provides a joint formed by the method of the first aspect.

The projections may be grown on the bond surface in a series of layers, each layer being grown by directing energy and/or material to the bond surface. Suitable additive fabrication techniques may be a "powder bed" process (in which a series of layers of powder are deposited on the bond region and selected parts of each layer are fused by a power beam) or "powder feed" process (in which powder is deposited on selected parts of the bond region and then fused by a power beam, such as a laser or electron beam). Alternatively the projections may be formed by friction welding a set of projections onto the bond surface. Yet further, the projections may be formed by fused deposition (in which molten material is extruded through a nozzle). Alternatively, the projections may be formed by the method described in WO 2004/028731 A1, whereby the projections are formed by successively flicking up material from the bond surface. The above techniques for forming the projections are purely exemplary and virtually any method may be used.

The orientation of each tip centreline is preferably determined based upon one or more of: a profile of the bond surface; a predetermined starting orientation of the first component and the flexible layer just prior to joining; and a predetermined initial point of contact between the first component and the flexible layer during joining.

Preferably, the projections are oriented such that as the flexible layer and the first component are brought together, each projection achieves penetration of the layer whilst the local projection centreline maintains a small, or even zero angle, with respect to the local surface normal of the layer. In this way, the tear effect on the flexible layer as the projections are embedded into the layer is reduced.

The bond surface may be planar, convex, or possibly even concave. The projections may be symmetrical (for instance cylindrical or conical, and extend at right angles to the component) or at least one of the projections may be asymmetrical (for instance the projection(s) may lean to one side and/or may have a non-circular cross-section). The centreline of the projections may be straight or may be curved. The projections are preferably slender, having an aspect ratio of two or more.

The first component and the flexible layer are preferably brought together by draping the flexible layer over the component. The draping may be performed manually or a computer controlled tape laying machine may be used. A soft roller may be required to adequately embed the projections in the layer. The first component may be set in a mould tool over which the flexible layer is draped. Alternatively, the first component having the projections may be rolled, or otherwise moved, over the flexible layer so as to embed the projections in the layer.

One or more further flexible layers may be similarly joined to the first component on top of the flexible layer by bringing the first component and each further flexible layer together. The projections may become embedded in at least some of the further flexible layers during joining.

The flexible layer may be one or more fibre reinforced plies. The layer may be laid up as a dry fibre layer to which resin is infused after the projections are embedded in the layer. Alternatively, the layer may a fibre layer pre-impregnated with the resin, a so-called "pre-preg", in which the projections are embedded. After embedding the projections in the layer, vacuum bagging, and then infusing resin, if necessary, the fibre reinforced composite layer may need to be cured. The composite layer may be, for example, carbon fibre reinforced plastic (CFRP), glass fibre reinforced plastic (GFRP), or Aramids such as Kevlar. Alternatively the flexible layer may be a thermoplastic such as polyetheretherketone (PEEK). The thermoplastic may need to be softened by heating to make it sufficiently flexible prior to embedding the projections. The thermoplastic may be hardened by leaving it to cool after embedding the projections.

Preferably, the flexible layer is co-cured with the first component after the projections are embedded in the flexible layer, so as to form the second component from the flexible layer. If a plurality of flexible layers are joined to the first component then each may be cured separately on the first component, or curing may be performed after a batch, or all, of the layers have been laid up on the first component.

The projections may be formed from the same material as the first component, or they may be formed from a different material.

The joint may be used to joint structural components, for instance in an aerospace application. For example, the joint may be used to join a reinforcing plate, floating rib foot, or stringer to a panel such as a wing or fuselage cover; or a bracket fitting to an aileron. Alternatively, the joint may be used to join adjacent layers in a laminate structure.

BRIEF DESCRIPTION OF THE DRAWINGS

Embodiments of the invention will now be described with reference to the accompanying drawings, in which.

DETAILED DESCRIPTION OF EMBODIMENTS

Figure 1:
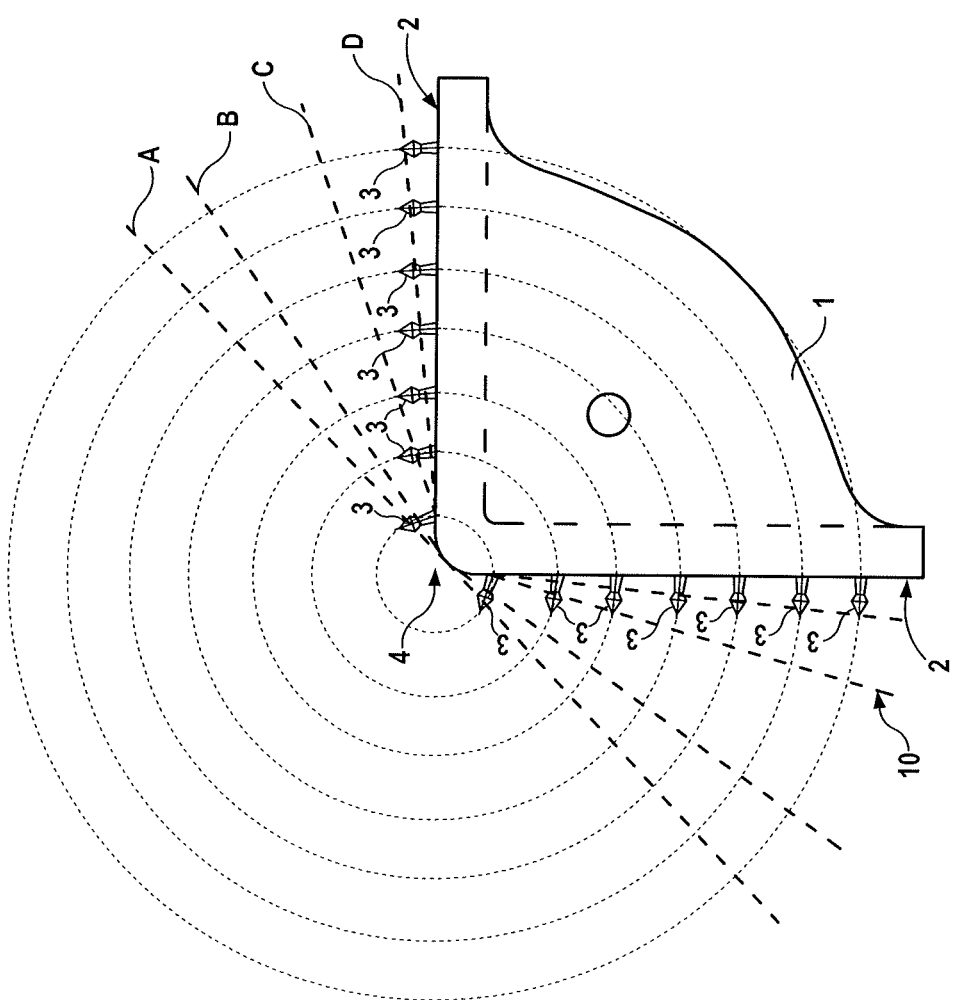
FIG. 1 illustrates a bracket component having an array of projections of varying orientation.

A metallic corner bracket component 1 shown in FIG. 1 comprises an outer bond surface 2. An array of surface features or projections 3 extend from the bond surface 2. As can be seen in FIG. 1, the projections 3 of one row of the array are distributed substantially evenly over the bond surface, leaving only a small space in the region of highest curvature at the apex without projections 3. The projections 3 each have a tip, a base, and a centreline.

Figure 2:
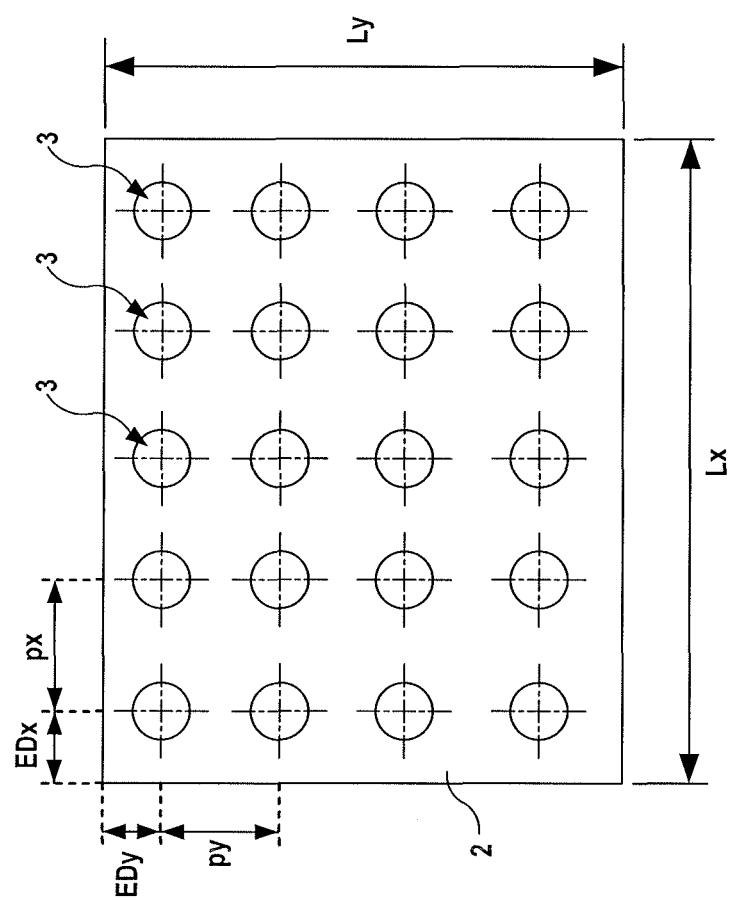
FIG. 2 illustrates an array of projections.

As shown in FIG. 2, the projections 3 are arranged on the bond surface 2 in a two-dimensional array in an x-y plane. FIG. 2 shows only a portion of the bond surface 2 having an edge length Lx in the x-direction and an edge length Ly in the y-direction. Only an outline of the footprint of the projections 3 on the bond surface 2 is shown in FIG. 2. The base of the projections are spaced from an edge of the component by a distance EDx in the x-direction and a distance EDy in the y-direction. The base of the projections are spaced apart by a pitch px in the x-direction and a pitch py in the y-direction.

Figure 3B:
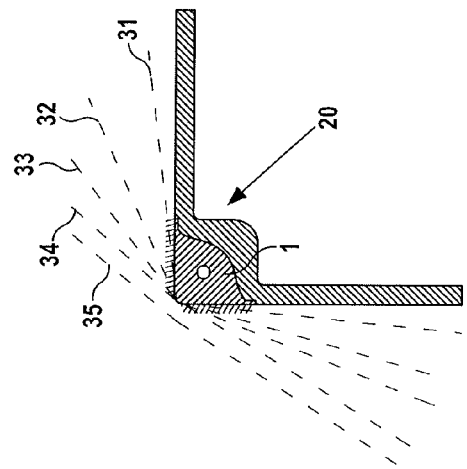
FIG. 3b illustrates a lay-up process by which successive plies are draped over the bracket and the tool.
Figure 3D:
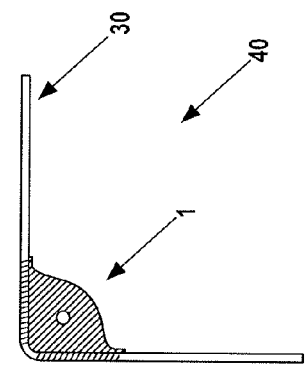
FIG. 3d illustrates the completed hybrid part after curing and de-moulding.
Figure 3A:
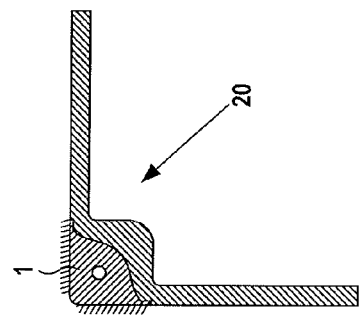
FIG. 3a illustrates the bracket component of FIG. 1 mounted in a recess in a mould tool.

Next, joining of the bracket component 1 to a laminate composite component 30 to form a hybrid part 40 will be described with reference to FIGS. 3a to 3d. The bracket component 1 is integrated into a mould tool 20 having a mould surface with a recess which receives the bracket component, as shown in FIG. 3a.

After the bracket component 1 has been integrated into the mould tool, a composite lay-up is laid over the bracket component 1 and the mould tool 20. The composite lay-up comprises a series of plies 31-35 of uni-axial carbon fibre, pre-impregnated with uncured epoxy resin. Each ply is conventionally known as a "prepreg". As shown in FIG. 3b, the initial prepreg 31 is penetrated by the projections 3 as the prepreg 31 is draped over the bond surface 2. The orientation of the projections 3 will be explained in detail below. Further plies 32-35 are draped successively over the bond surface 2 to complete the composite lay-up. A soft roller may be rolled over the prepregs 31-35 so that the projections 3 become fully embedded. The soft roller may be applied after each ply is laid, after a group of plies have been laid, or after the final ply has been laid.

Figure 3C:
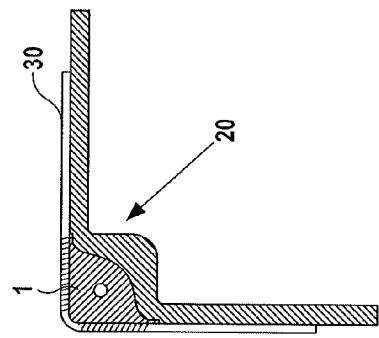
FIG. 3c illustrates the completed lay-up prior to cure.

FIG. 3c shows the completed ply lay-up of the second component 30 on the bracket 1 and the tool 20 ready for consolidation and curing of the prepregs by a so-called "vacuum bagging" process. That is, the lay-up is covered by a vacuum membrane (and optionally various other layers such as a breather layer or peel ply); the vacuum membrane is evacuated to apply consolidation pressure and extract moisture and volatiles; and the lay-up is heated (optionally in an autoclave) to cure the epoxy resin matrix. As the epoxy resin matrix melts prior to cure, it flows into intimate contact with the projections 3. The projections 3 mechanically engage with the matrix, while also increasing the surface area of the bond.

As a result of the curing process, the metallic bracket 1 (the first component) and the laminate composite component 30 (the second component) are joined to form a hybrid part 40 which is then removed from the mould tool 20. The hybrid part 40 is shown in FIG. 3d and may be assembled with various other components.

The centreline of each projection 3 is defined such that it is possible to drape the composite ply over it and achieve penetration of the ply while maintaining a small, ideally zero, angle between the local surface normal of the ply and the centreline of the projection. This reduces the tendency for the projection 3 to tear laterally through the ply during draping. Ideally, the hole created in the ply is of a size sufficient only to accommodate the projection 3.

In order to define the projection centrelines to achieve this ideal aim, it is necessary to know the orientation of the component 1 and the ply at the point where the ply first comes into contact with the component. This is defined as the "initial drape point". In the example illustrated in FIG. 1, the initial drape point is a point 4 near the apex of the bracket 1, where a virtual ply 10 first engages with the projections 3 on either side of the apex. This modelling is used to calculate the appropriate geometry of the array of projections 3 on the bond surface 2.

A "contact point" is defined as the point at which the contacted ply 10 ceases to be in contact with the component 1 and remains tangential to the gradient of the local bond surface 2. The "contact point" is initially coincident with the "initial drape point" but moves across the surface 2 as the ply is draped. Movement of the contact point away from the initial drape point can be seen in FIG. 1 as the ply 10 moves through positions A to D.

The centrelines of the projections 3 are ideally designed such that at the point of intersection between a surface tangent from the "contact point" and the projection centreline, there is a normal condition locally. This results in features that are normal to the local surface at their base, and curve as they extend from the surface with varying local curvature related to the profile of the bond surface 2. The projection centrelines 11 form concentric circles in the particular example illustrated in FIG. 1, with the initial drape point 4 at the centre.

Where more than one initial drape point is theoretically possible, the initial drape point will usually be chosen as that which allows the projections to be formed with minimum angularity to the bond surface.

Idealised projection centrelines will often not be easy to manufacture, depending on the method employed to prepare the bond surface 2 of the component 1 by forming the projections 3. To that end, many benefits of this invention may still be seen even when the local normal condition set out above is not strictly satisfied.

For example, whilst the centrelines 11 of the projections 3 shown in FIG. 1 have curvature, the shape of the projections approximates to an array of straight projections set at varying angles of inclination with respect to the bond surface. Alternatively, projections having curved centrelines could be used that do not satisfy the local normal condition exactly, such that the centreline is not strictly normal to the bond surface at the base of the projections. In this way, it may be possible to get away with a lower radius of curvature in the projections, which may be easier to manufacture, whilst still achieving an ideal orientation at the tip of each projection.

What is important is that the centreline at the tip of each projection is oriented at an angle with respect to the normal to the bond surface at its base, wherein the angular orientation of the tip centrelines varies across the array of projections. Note that the situation in which the bond surface is planar is considered trivial and outside the scope of this invention, as the component would be formed having projections normal to the bond surface and the normal condition could be satisfied through simply bringing the planar bond surface parallel to the flexible layer so as to embed the projections in the flexible layer.

Figure 4:
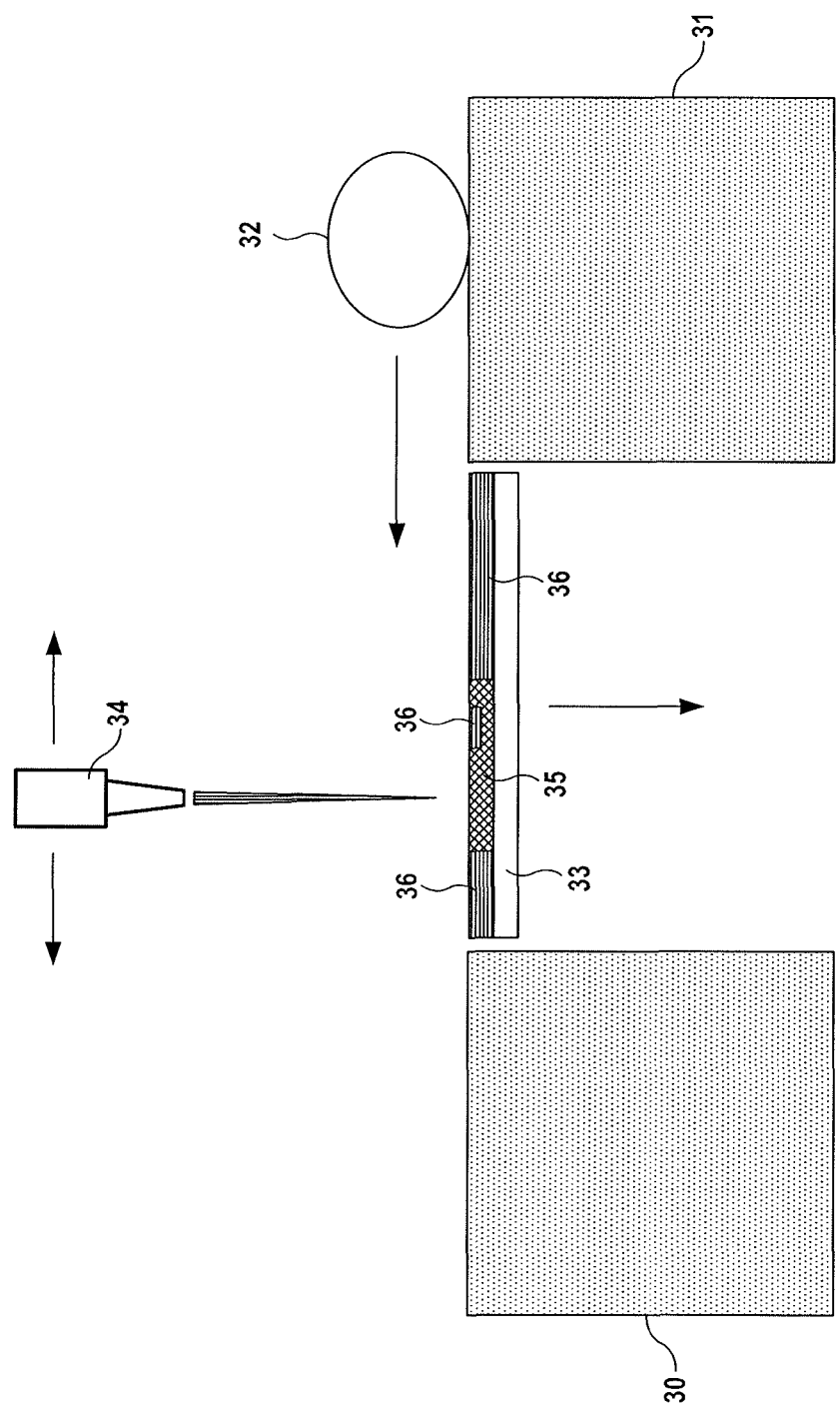
FIG. 4 illustrates a schematic view of a powder bed fabrication system.
Figure 5:
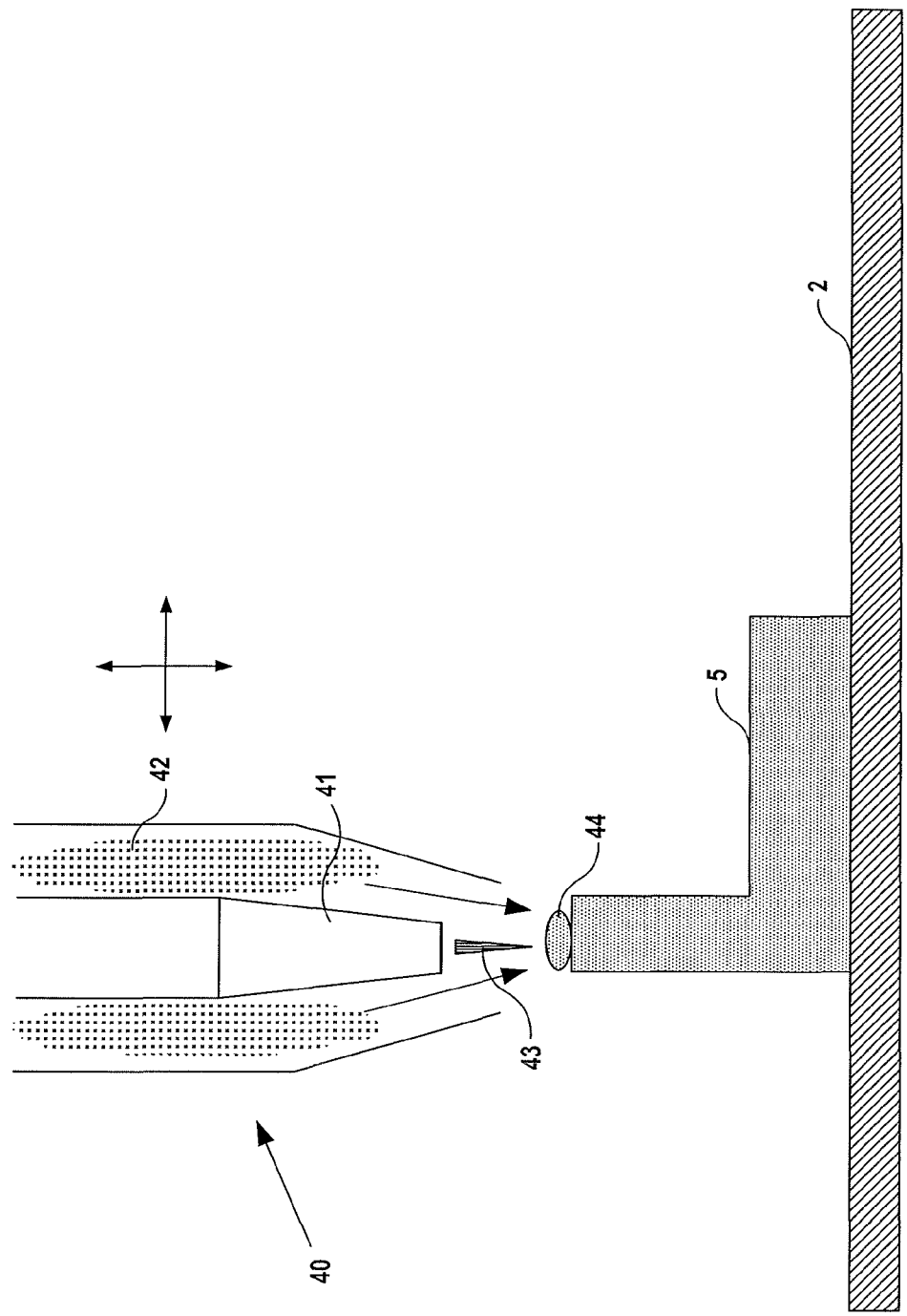
FIG. 5 illustrates a schematic view of a powder feed fabrication system.

Each projection 3 is grown in a series of layers by an additive manufacturing process: either a powder bed process as shown in FIG. 4, or a powder feed process as shown in FIG. 5.

In the powder bed process shown in FIG. 4, the array of projections is formed by scanning a laser head laterally across a powder bed and directing the laser to selected parts of the powder bed. More specifically, the system comprises a pair of feed containers 30, 31 containing powdered metallic material such as powdered Titanium. A roller 32 picks up powder from one of the feed containers (in the example of FIG. 4, the roller 32 is picking up powder from the right hand feed container) and rolls a continuous bed of powder over a support member 33. A laser head 34 then scans over the powder bed, and a laser beam from the head is turned on and off to melt the powder in a desired pattern. The support member 33 then moves down by a small distance (typically of the order of 0.1 mm) to prepare for growth of the next layer. After a pause for the melted powder to solidify, the roller 32 proceeds to roll another layer of powder over support member 33 in preparation for sintering. Thus as the process proceeds, a sintered part 35 is constructed, supported by unconsolidated powder parts 36. After the part has been completed, it is removed from support member 33 and the unconsolidated powder 36 is recycled before being returned to the feed containers 30, 31.

The powder bed system of FIG. 4 can be used to construct the entire bracket component 1, including projections 3. Movement of the laser head 34 and modulation of the laser beam is determined by a Computer Aided Design (CAD) model of the desired profile and layout of the part.

The powder feed fabrication system shown in FIG. 5 can be used to build up the projections 3 on a previously manufactured bracket component 1. That is, the bracket component 1 without the projections has been previously manufactured before being mounted in the powder feed fabrication mechanism.

A projection 3 is shown being built up on the bond surface 2 of one arm of the bracket component 1 in FIG. 5. The powder feed fabrication system comprises a movable head 40 with a laser 41 and an annular channel 42 around the laser 41. Un-sintered powder flows through the channel 42 into the focus of the laser beam 43. As the powder is deposited, it melts to form a bead 44 which becomes consolidated with the existing material.

The powder feed system may be used to grow the projections in series, or in parallel. More specifically, the projections may be grown in parallel by the following sequence:

$P(1)L(1), P(2)L(1), \ldots P(n)L(1), P(1)L(2), P(2)L(2), \ldots P(n)L(2) \ldots$ etc.

or in series by the following sequence:

$P(I)L(1), P(1)L(2), \ldots P(1)L(m), P(2)L(1), P(2)L(2), \ldots P(2)L(m) \ldots$ etc.

where $P(X)L(Y)$ represents the growth of a layer X of a projection Y.

This can be contrasted with the powder bed system which can only grow the projections in parallel.

In contrast to the powder bed system of FIG. 4, the powder feed system of FIG. 5 directs powder to only the selected parts of the bond region, and fuses the powder as it is delivered. Therefore the powder feed mechanism produces structures that are unsupported by powder, and so supports (not shown) may need to be built integrally into the part and machined off later, in particular where the projections have large overhanging parts.

The head 40 may be the only moving feature in the process, or the part may be rotated during fabrication. In other words, the head 40 directs powder to selected parts of the bond region with the part in a first orientation relative to the head 40; the part is rotated so that it adopts a second orientation relative to the head 40; and the head then directs material to selected parts of the bond region with the part in the second orientation. This facilitates the manufacturing of complex shapes without the need for removable supports. For instance overhanging features can be formed by rotating the part between layers in order to always ensure that the element being built is at no more than 30 degrees from the vertical. As the build area is at a temperature significantly below the melting point of the material, the area being built will only need to maintain a supportable angle for a brief time after the laser energy is removed in order for it to solidify enough to become self supporting. If the projections are built in a parallel sequence then it is possible to re-orientate the part between each layer to enable unsupported overhanging features to be built.

The laser source of either the powder bed or powder feed systems can be replaced by another power beam source, such as an electron beam source for directing an electron beam.

The projection may take many different shapes. The projection may be a conical spike. The projection may have an overhang. The projection may be rotationally symmetrical about its centreline, or may be asymmetrical. The centreline may be curved along all or part of its length, or may be straight. The projection may include a lateral projection or ridge. The projection may include one or more of the above features, depending on the type of joint to be formed.

The aspect ratio of the projections may be relatively high, giving firm mechanical engagement and a high surface area. If we define the aspect ratio as H/W, where H is the height perpendicular to the bond surface of the component and W is the average width parallel to the bond surface, then the aspect ratio varies between approximately 2 and 6. The aspect ratio of the projections may be increased or decreased to give the desired properties, but is preferably at least 2.

The flexible layer may be reinforced with glass or carbon fibres; or may be a thermoplastic layer without reinforcement, such as polyetheretherketone (PEEK). The projections may be formed from a metallic material (for instance Titanium or stainless steel); or a thermoplastic material such as polyetheretherketone (PEEK). The projections may be formed from the same material as the first component or the flexible layer, or a different material.

The first component may take virtually any shape and have a bond surface that is planar, convex or concave. The first component may include mounting features, such as fixing holes, so that the first component may be mounted to other components in a final assembly.

Although the invention has been described above with reference to one or more preferred embodiments, it will be appreciated that various changes or modifications may be made without departing from the scope of the invention as defined in the appended claims.

The invention claimed is:

1. A method of joining a first component to a second component, the method comprising:
    preparing the first component by forming an array of elongate projections on a bond surface of the component, each projection having a centreline, a tip, and a base, wherein the centreline at the tip of each projection is oriented at an angle with respect to the normal to the bond surface at its base, and wherein the angular orientation of the tip centerlines varies across the array of projections;
    bringing the first component and a plurality of hardenable flexible laminate ply layers together so as to embed the projections in at least some of the hardenable flexible laminate ply layers; and
    hardening the plurality of hardenable flexible laminate ply layers to form the second component after the array of projections has been embedded into said at least some hardenable flexible laminate layers.

2. A method according to claim 1, wherein the projections are grown on the bond surface in a series of layers, each layer being grown by directing energy and/or material to the bond surface.

3. A method according to claim 2, wherein each layer is grown by an additive fabrication process.

4. A method according to claim 1, wherein the orientation of each tip centreline is determined based upon the profile of the bond surface.

5. A method according to claim 1, wherein the orientation of each tip centreline is determined based upon a predetermined starting orientation of the first component and at least a first of the plurality of hardenable flexible laminate ply layers just prior to joining.

6. A method according to claim 1, wherein the orientation of each tip centreline is determined based upon a predetermined initial point of contact between the first component and at least a first of the plurality of hardenable flexible laminate ply layers during joining.

7. A method according to claim 1, wherein the first component and at least a first of the plurality of hardenable flexible laminate ply layers are brought together by draping the at least first said hardenable flexible laminate ply layer over the first component.

8. A method according to claim 7, wherein the component is set in a mould tool over which the at least first said hardenable flexible laminate ply layer is draped.

9. A method according to claim 1, wherein the first component is permanently joined to the second component.

10. A method according to claim 1, wherein at least a portion of the bond surface is non-planar.

* * * * *